Sept. 7, 1965      M. E. KING      3,205,396

ARC WELDING APPARATUS

Filed Dec. 26, 1962

INVENTOR
Milton E. King

United States Patent Office

3,205,396
Patented Sept. 7, 1965

3,205,396
ARC WELDING APPARATUS
Milton E. King, Eagle Township, Waukesha County, Wis., assignor to Automatic Welding Company, Waukesha, Wis., a corporation of Wisconsin
Filed Dec. 26, 1962, Ser. No. 247,019
5 Claims. (Cl. 314—71)

This invention relates to arc welding apparatus and particularly to arc welding apparatus of relatively simple and inexpensive construction for controlling in improved manner the feed rate of a continuously fed consumable welding electrode both during welding and during inching while not welding.

For many years a large variety of proposals have been made for controlling the feed rate during welding and during inching of continuously fed consumable welding electrodes. Numerous problems exist which have defied satisfactory solution prior to the present invention. One problem not heretofore satisfactorily solved was the slow reaction of feed rate to arc changes. Also, prior to the present invention speed control mechanisms for such welding electrodes have required one setting for welding and another setting for inching. Further, the welding apparatus has been designed for use with only a variable voltage power source or with only a constant potential power source, and no single apparatus has provided for satisfactory operation with both types of power source. Another problem which has long defied satisfactory solution is the provision of means for controlling the feed rate of a continuously fed consumable welding electrode adaptable for use with portable arc welding apparatus equipped with a manually positioned welding nozzle or gun (usually called "semi-automatic") and also adaptable for use with non-portable arc welding apparatus equipped with a mechanically positioned fixture carrying the welding nozzle or gun (usually called "automatic").

My invention has for one of its objects to provide means for controlling the feed rate of a continuously fed consumable welding electrode in arc welding apparatus which requires no source of power other than that used to supply the welding arc. Another object is to provide an electrode feed speed control system which reacts very quickly in a compensatory manner to slight arc length changes.

A further object is to provide for an inching or no-welding feeding rate of the welding electrode which is approximately constant regardless of the open circuit voltage of the welding power source.

A still further object is to provide an electrode feed speed control system which with slight modification accomplishes highly satisfactory results employing either variable voltage direct current or constant potential direct current as the welding power source.

I provide arc welding apparatus comprising a direct current shunt wound motor having an armature and field coils, welding electrode feeding means operated by the motor to feed a consumable welding electrode and a fixed resistance element in series with the armature, a predetermined portion of the fixed resistance element and a tap from the fixed resistance element intermediate the ends thereof and between said predetermined portion of the fixed resistance element and the remainder of the fixed resistance element being in series with the field coils, the fixed resistance element in series with the armature and said predetermined portion of the fixed resistance element in series with the field coils being so proportioned that over the normal range of open circuit voltage the welding electrode feeding means operate at approximately constant speed when the welding electrode is being fed while not welding.

I further provide arc welding apparatus comprising a source of direct current for the welding arc, a direct current shunt wound motor having an armature and field coils, connections through which the motor is operated by current from the source of direct current at the voltage of the welding arc, welding electrode feeding means operated by the motor to feed a welding electrode and a variable resistance element in series with the armature for controlling the speed of feed of the welding electrode during welding. A fixed resistance element is preferably provided in series with the armature, a predetermined portion of the fixed resistance element and a tap from the fixed resistance element intermediate the ends thereof and between said predetermined portion of the fixed resistance element and the remainder of the fixed resistance element being in series with the field coils, the fixed resistance element in series with the armature and said predetermined portion of the fixed resistance element in series with the field coils being so proportioned that over the normal range of open circuit voltage the welding electrode feeding means operate at approximately constant speed when the welding electrode is being fed while not welding, the variable resistance element in series with the armature being in parallel with the fixed resistance element during welding for controlling the speed of feed of the welding electrode during welding. Means are preferably provided which are operated by the welding current connecting the variable resistance element in series with the armature in parallel with the fixed resistance element.

I further provide arc welding apparatus comprising a source of constant voltage direct current for the welding arc, a direct current shunt wound motor having an armature and field coils, connections through which the motor is operated by current from said source of constant voltage direct current at the voltage of the welding arc, welding electrode feeding means operated by the motor to feed a welding electrode and variable resistance means in series with the armature for controlling the speed of feed of the welding electrode during welding and when the welding electrode is being fed while not welding. There is preferably provided a fixed resistance element in series with the armature together with a variable resistance element, means operated by the welding curent connecting the variable resistance element in series with the armature in parallel with the fixed resistance element for controlling the speed of feed of the welding electrode during welding and disconnecting the variable resistance element from the armature when not welding and means appliable to connect the variable resistance element in series with the armature in parallel with the fixed resistance element when not welding for controlling the speed of feed of the welding electrode when the welding electrode is being fed while not welding. The field coils are preferably in parallel with the source of constant voltage direct current with variable resistance means in series with the armature for controlling the speed of feed of the welding electrode during welding and when the welding electrode is being fed while not welding.

More specifically, my arc welding apparatus may comprise a source of direct current for the welding arc, a direct current shunt wound motor having an armature and field coils, connections through which the motor is operated by current from said source of direct current at the voltage of the welding arc, welding electrode feeding means operated by the motor to feed a welding electrode, a fixed resistance element in series with the armature, means connecting a predetermined portion of the fixed resistance element and a tap from the fixed resistance element intermediate the ends thereof and between said predetermined portion of the fixed resistance element and the remainder of the fixed resistance element in series with the field coils when the current source is a source of variable voltage direct current, the fixed resistance element in series with the armature and said predetermined portion of the fixed resistance element in series with the field coils being so proportioned that over the normal range of open circuit voltage the welding electrode feeding means operate at approximately constant speed when the welding electrode is being fed while not welding, a variable resistance element, means operated by the welding current connecting the variable resistance element in series with the armature in parallel with the fixed resistance element during welding for controlling the speed of feed of the welding electrode during welding, means connecting the field coils in parallel with the current source when the current source is a source of constant voltage direct current and means appliable to connect the variable resistance element in series with the armature in parallel with the fixed resistance element when not welding when the current source is a source of constant voltage direct current for controlling the speed of feed of the welding electrode when the welding electrode is being fed while not welding.

Other details, objects and advantages of the invention will become apparent as the following description of a present preferred embodiment thereof proceeds.

In the accompanying drawings I have shown a present preferred embodiment of the invention in which—

Figure 1:
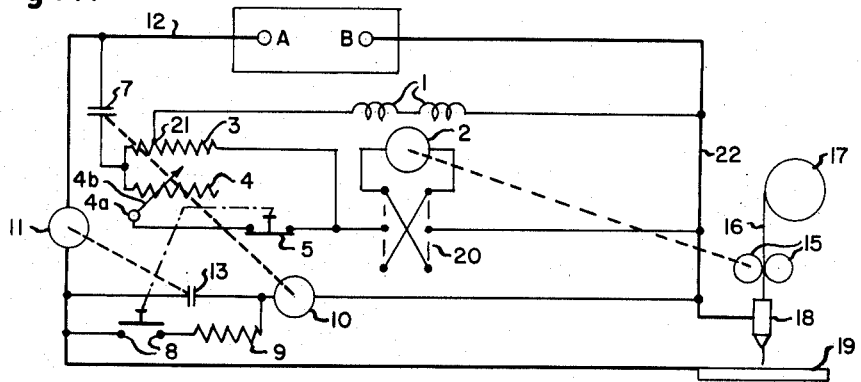
FIGURE 1 is an elementary diagram of arc welding apparatus having control circuitry for controlling the feed rate of a continuously fed consumable welding electrode or wire both during welding and during inching.

My welding apparatus is designed for use with either a direct current variable voltage power source or a direct current constant potential power source. For example, a direct current variable voltage power source having an open circuit voltage in the range 60–125 volts or a direct current constant potential power source having an open circuit voltage normally not exceeding 60 volts may be employed.

There is shown diagrammatically in the drawings a direct current shunt wound motor having field coils 1 and an armature 2. A motor of this type exhibits superior characteristics of speed regulation and ease of control in comparison to series wound, compound wound or universal type motors. In series with the motor armature 2 is a predetermined fixed resistance element 3 having a tap 21 at a predetermined position intermediate its ends and extending to the field coils 1. The purpose of the tap 21 will presently be described.

A variable resistance element 4 is provided which through a normally closed push button switch 5 is connected in parallel with the fixed resistance element 3. The variable resistance element 4 includes a manually operable knob 4a for operating a contactor 4b to determine the portion of the resistance element 4 which is in parallel with the resistance element 3.

The power source is shown as having terminals A and B. A conductor 12 extends from the terminal A. A set of normally open contacts 7 is connected in between the conductor 12 and the outer ends of the resistance elements 3 and 4.

The push button switch 5 may have normally open contacts 8 between the conductor 12 and a fixed resistance element 9 for the purpose of protecting the motor starter contactor solenoid 10 from over voltage. A solenoid 11 is disposed in the conductor 12 and is actuated by the flow of current therethrough, the solenoid 11 being commonly referred to as a "current relay." Normally open contacts 13 are disposed between the conductor 12 and the solenoid 10. The common sides of armature 2, field coils 1, and solenoid 10 are connected to a conductor 22 which extends to the terminal B of the power source. The armature 2 is connected through suitable gearing with electrode or welding wire feed rolls 15 which feed the electrode or welding wire 16 from a spool or bulk supply 17 through the welding nozzle or gun 18 to the workpiece 19 to which the conductor 12 is connected as shown.

Figure 2:
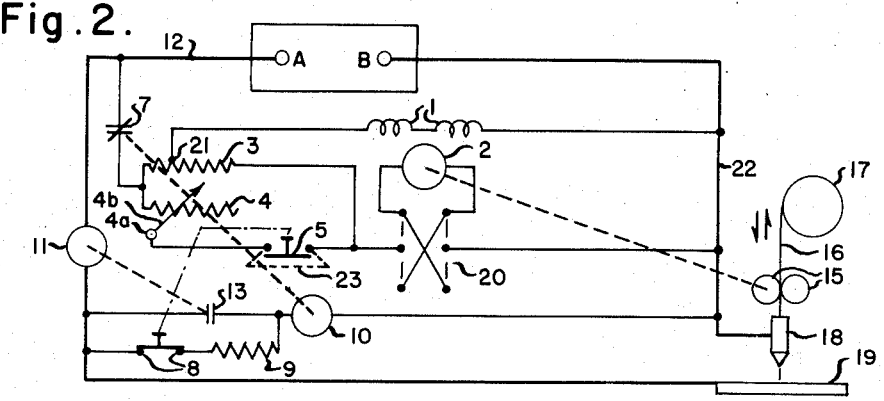
FIGURE 2 is an elementary diagram similar to FIGURE 1 illustrating the control circuitry for inching.

In FIGURE 2 the circuitry is set up for inching. The desired direction of inching is selected by disposing the reversing switch 20 in the proper position, it being understood that the reversing switch determines the direction of rotation of the armature 2 and hence the direction of rotation of the rolls 15. The normally closed push button switch 5 is operated to open its contacts as shown in FIGURE 2 disconnecting the variable resistance element 4 from the circuit. At the same time the contacts 8 close completing the circuit from the conductor 12 through the fixed resistance element 9 to the motor starter contactor solenoid 10. This causes the motor starter contactor contacts 7 to close completing the power circuit to the field coils 1 and the armature 2 of the motor and causing the motor to turn the feed rolls 15 to feed the electrode 16 in the direction determined by the switch 20.

As is well known to those skilled in the art, varying the armature voltage of a shunt wound motor will cause a proportionate change in motor speed, while varying the field voltage will cause an inverse change in motor speed. As above indicated, my apparatus is designed for use with a variable voltage welding power source having for example an open circuit voltage in the general range 60–125 volts direct current. I provide for maintaining an inching rate which is approximately uniform regardless of what voltage is applied to the circuit. A higher voltage across the welding power source terminals A and B will cause a higher voltage across the motor armature 2 and across the motor field coils 1. The higher voltage across the field coils 1 tends to slow the motor and maintain the motor speed within useable limits despite increase in the voltage through the armature. Conversely, when the voltage across the terminals A and B is lowered the voltage applied to the field coils 1 and the armature 2 is lowered. Such reduction in field voltage allows the motor to operate at a useable rate even though the armature voltage has been reduced.

Also my apparatus is designed for use with a welding power source having an open circuit voltage which is only slightly greater than or nearly equal to the load voltage; this is referred to as a constant potential power source by those skilled in the art.

When my apparatus is used with a constant potential power source a jumper 23 (FIGURE 2) is connected across the terminals of the push button switch 5 which maintains the variable resistance element 4 in parallel with the fixed resistance element 3 even when the push button switch is open, causing the motor while inching to operate at a speed very close to the speed at which it operates while welding.

Figure 3:
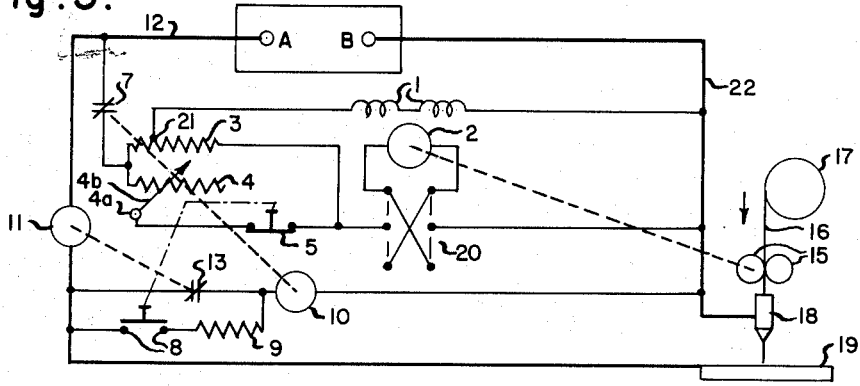
FIGURE 3 is an elementary diagram similar to FIGURE 1 illustrating the control circuitry for welding.

FIGURE 3 shows the circuitry set up for welding. Establishment of a welding arc is accomplished in one of two ways. When the apparatus is used with a manually positioned welding nozzle or gun 18 it is merely necessary for the operator to touch the electrode to the workpiece 19 thereby completing the welding circuit and causing the current relay solenoid 11 to actuate closing the contacts 13. When the apparatus is used with a mechanically held welding nozzle 18 the inching switch is operated causing the welding electrode 16 to advance toward the workpiece 19. When the welding electrode 16 makes contact with the workpiece 19 it completes the welding circuit and causes the solenoid 11 to actuate, closing the contacts 13. In both of these cases, i.e., when welding in contradistinction to inching, the reversing switch 20 must be in the position to advance the welding wire 16 out of the welding nozzle or gun 18 toward the workpiece 19.

When the welding electrode 16 advancing through the welding nozzle or gun 18 contacts the workpiece 19 welding current flows from the power source to the gun 18 which induces current into the electrode 16 causing an arc to be established between the electrode 16 and the workpiece 19. Current in flowing through the conductor 12 operates the solenoid 11 and closes the contacts 13 which completes the electrical circuit to the motor starter contactor solenoid 10 which in turn closes the contacts 7 and completes the circuit to the motor through both the fixed resistance element 3 and the variable resistance element 4 in parallel.

Adjustment of the variable resistance element 4 is effected manually as above described and determines the speed of feed of the wire 16 which is determined by the type of wire used, the desired arc voltage, the welding current and the power output setting of the welding power source.

Since the motor circuit is connected in shunt with the welding arc a variance in arc voltage caused by uneven work surfaces or operator movement will cause the motor speed to vary accordingly and in a compensatory manner. Lengthening of the welding arc causes a higher voltage which in turn causes an increase in motor speed. Shortening of the arc causes a lower arc voltage which in turn causes decrease in the motor speed, reducing the rate of feed of the welding wire or electrode to the arc zone.

Fast response of the motor to arc voltage changes is highly desirable in order to maintain a uniform weld deposit rate. Such response should be accomplished without overshoot or oscillation of the feed motor. My apparatus provides for optimum speed in response to arc voltage change without overshoot or oscillation. Since the electrical resistance of the motor armature varies with the applied voltage the voltage drop across the resistance elements 3 and 4 remains very nearly constant; any arc voltage change is immediately impressed on the motor armature. As is well known by those skilled in the art, the speed of a direct current shunt wound motor is proportional to the voltage applied to its armature up to the maximum allowable limits determined by mechanical and electrical design characteristics. The maximum speed and armature voltage of the motor of my apparatus may be of predetermined value such that at normal arc voltages, for example in the range 25-35 volts, a small percentage change in arc voltage reflects a large percentage of speed change which in turn provides quick response to both increase and decrease in arc voltage.

Since the motor field is of an inductive nature it tends to change its condition of saturation more slowly than the motor armature. This reluctance to change provides a stabilizing influence retarding the effect of motor overshoot or oscillation with speed changes.

While I have shown and described a present preferred embodiment of the invention it is to be distinctly understood that the invention is not limited thereto but may be otherwise variously embodied within the scope of the following claims.

I claim:

1. Arc welding apparatus comprising a direct current shunt wound motor having an armature and field coils, welding electrode feeding means operated by the motor to feed a consumable welding electrode and a fixed resistance element in series with the armature, said motor being the sole source of motive power for operating the welding electrode feeding means, a predetermined portion of said fixed resistance element and a tap from said fixed resistance element intermediate the ends thereof and between said predetermined portion of said fixed resistance element and the remainder of said fixed resistance element being in series with the field coils, said fixed resistance element in series with the armature and said predetermined portion of said fixed resistance element in series with the field coils being so proportioned that over the normal range of open circuit voltage the welding electrode feeding means operate at approximately constant speed when the welding electrode is being fed while not welding.

2. Arc welding apparatus comprising a source of direct current for the welding arc, a direct current shunt wound motor having an armature and field coils, connections through which the motor is operated by current from the source of direct current at the voltage of the welding arc, welding electrode feeding means operated by the motor to feed a welding electrode, a fixed resistance element in series with the armature, a predetermined portion of said fixed resistance element and a tap from said fixed resistance element intermediate the ends thereof and between said predetermined portion of said fixed resistance element and the remainder of said fixed resistance element being in series with the field coils, said fixed resistance element in series with the armature and said predetermined portion of said fixed resistance element in series with the field coils being so proportioned that over the normal range of open circuit voltage the welding electrode feeding means operate at approximately constant speed when the welding electrode is being fed while not welding, and a variable resistance element in series with the armature in parallel with said fixed resistance element during welding for controlling the speed of feed of the welding electrode during welding.

3. Arc welding apparatus comprising a source of direct current for the welding arc, a direct current shunt wound motor having an armature and field coils, connections through which the motor is operated by current from said source of direct current at the voltage of the welding arc, welding electrode feeding means operated by the motor to feed a welding electrode, a fixed resistance element in series with the armature, a predetermined portion of said fixed resistance element and a tap from said fixed resistance element intermediate the ends thereof and between said predetermined portion of said fixed resistance element and the remainder of said fixed resistance element being in series with the field coils, said fixed resistance element in series with the armature and said predetermined portion of said fixed resistance element in series with the field coils being so proportioned that over the normal range of open circuit voltage the welding electrode feeding means operate at approximately constant speed when the welding electrode is being fed while not welding, a variable resistance element and means operated by the welding current connecting the variable resistance element in series with the armature in parallel with said fixed resistance element during welding for controlling the speed of feed of the welding electrode during welding.

4. Arc welding apparatus comprising a source of constant voltage direct current for the welding arc, a direct current shunt wound motor having an armature and field coils, connections through which the motor is operated by current from said source of constant voltage direct current at the voltage of the welding arc, welding electrode feeding means operated by the motor to feed a welding electrode, a fixed resistance element in series with the armature, a variable resistance element, means operated by the welding current connecting the variable resistance element in series with the armature in parallel with the fixed resistance element for controlling the speed of feed of the welding electrode during welding and disconnecting the variable resistance element from the armature when not welding and means applicable to connect the variable resistance element in series with the armature in parallel with the fixed resistance element when not welding for controlling the speed of feed of the welding electrode when the welding electrode is being fed while not welding.

5. Arc welding apparatus comprising a source of direct current for the welding arc, a direct current shunt wound motor having an armature and field coils, connections through which the motor is operated by current from said source of direct current at the voltage of the welding arc, welding electrode feeding means operated by the motor to feed a welding electrode, a fixed resistance element in series with the armature, means connecting a predetermined portion of said fixed resistance element and a tap from said fixed resistance element intermediate the ends thereof and between said predetermined portion of said fixed resistance element and the remainder of said fixed resistance element in series with the field coils when the current source is a source of variable voltage direct current, said fixed resistance element in series with the armature and said predetermined portion of said fixed resistance element in series with the field coils being so proportioned that over the normal range of open circuit voltage the welding electrode feeding means operate at approximately constant speed when the welding electrode is being fed while not welding, a variable resistance element, means operated by the welding current connecting the variable resistance element in series with the armature in parallel with said fixed resistance element during welding for controlling the speed of feed of the welding electrode during welding, means connecting the field coils in parallel with the current source when the current source is a source of constant voltage direct current and means appliable to connect the variable resistance element in series with the armature in parallel with the fixed resistance element when not welding when the current source is a source of constant voltage direct current for controlling the speed of feed of the welding electrode when the welding electrode is being fed while not welding.

References Cited by the Examiner

UNITED STATES PATENTS

| | | | |
|---|---|---|---|
| 1,466,902 | 9/23 | Horton | 318—405 |
| 1,560,600 | 11/25 | Mortensen | 318—405 |
| 1,662,434 | 3/28 | Palmer | 314—69 |
| 2,393,662 | 1/46 | Skuhrovec | 314—72 |

RICHARD M. WOOD, *Primary Examiner.*

JOSEPH V. TRUHE, *Examiner.*